(12) United States Patent
Nomura

(10) Patent No.: US 8,199,417 B2
(45) Date of Patent: Jun. 12, 2012

(54) RETRACTABLE ZOOM LENS HAVING A VARIABLE APERTURE-STOP MECHANISM

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 217 days.

(21) Appl. No.: 12/817,239

(22) Filed: Jun. 17, 2010

(65) Prior Publication Data
US 2010/0328786 A1 Dec. 30, 2010

(30) Foreign Application Priority Data
Jun. 30, 2009 (JP) ................. 2009-154729

(51) Int. Cl.
*G02B 9/08* (2006.01)
(52) U.S. Cl. ............................................ 359/740
(58) Field of Classification Search ........... 359/738–740
See application file for complete search history.

(56) References Cited

U.S. PATENT DOCUMENTS

| | | | | |
|---|---|---|---|---|
| 6,835,006 | B2 * | 12/2004 | Tanaka et al. ............. | 396/349 |
| 2007/0217032 | A1 | 9/2007 | Matsumoto et al. | |

FOREIGN PATENT DOCUMENTS

| | | |
|---|---|---|
| JP | 2003-66311 | 3/2003 |
| JP | 2007-65040 | 3/2007 |
| JP | 2007-248770 | 9/2007 |
| JP | 2007-264356 | 10/2007 |

OTHER PUBLICATIONS

U.S. Appl. No. 12/793,031 entitled Retractable Zoom Lens in the name of Hiroshi Nomura filed Jun. 3, 2010.
U.S. Appl. No. 12/795,062 entitled Retractable Zoom Lens Having Variable Aperture-Stop Mechanism in the name of Hiroshi Nomura filed Jun. 7, 2010.
Japan Office action, dated Sep. 27, 2011 along with an english translation thereof.

* cited by examiner

*Primary Examiner* — Joseph P Martinez
(74) *Attorney, Agent, or Firm* — Greenblum & Bernstein P.L.C.

(57) ABSTRACT

A zoom lens includes a variable aperture-stop mechanism positioned in front or behind an aperture-control lens group; a first rotation imparting member, which rotates an opening/closing ring of the variable aperture-stop mechanism by a relative movement between the variable aperture-stop mechanism and the first rotation imparting member in the optical axis direction so as to hold an adjustable aperture of the variable aperture-stop mechanism at a small aperture size when the aperture-control lens group moves within in the zooming range; and a second rotation imparting member, which rotates the opening/closing ring by a relative movement between the variable aperture-stop mechanism and the second rotation imparting member to open and hold the adjustable aperture at a large aperture size when the aperture-control lens group moves to the accommodated position, at which the aperture-control lens group is partly positioned in the adjustable aperture held at the large aperture size.

12 Claims, 14 Drawing Sheets

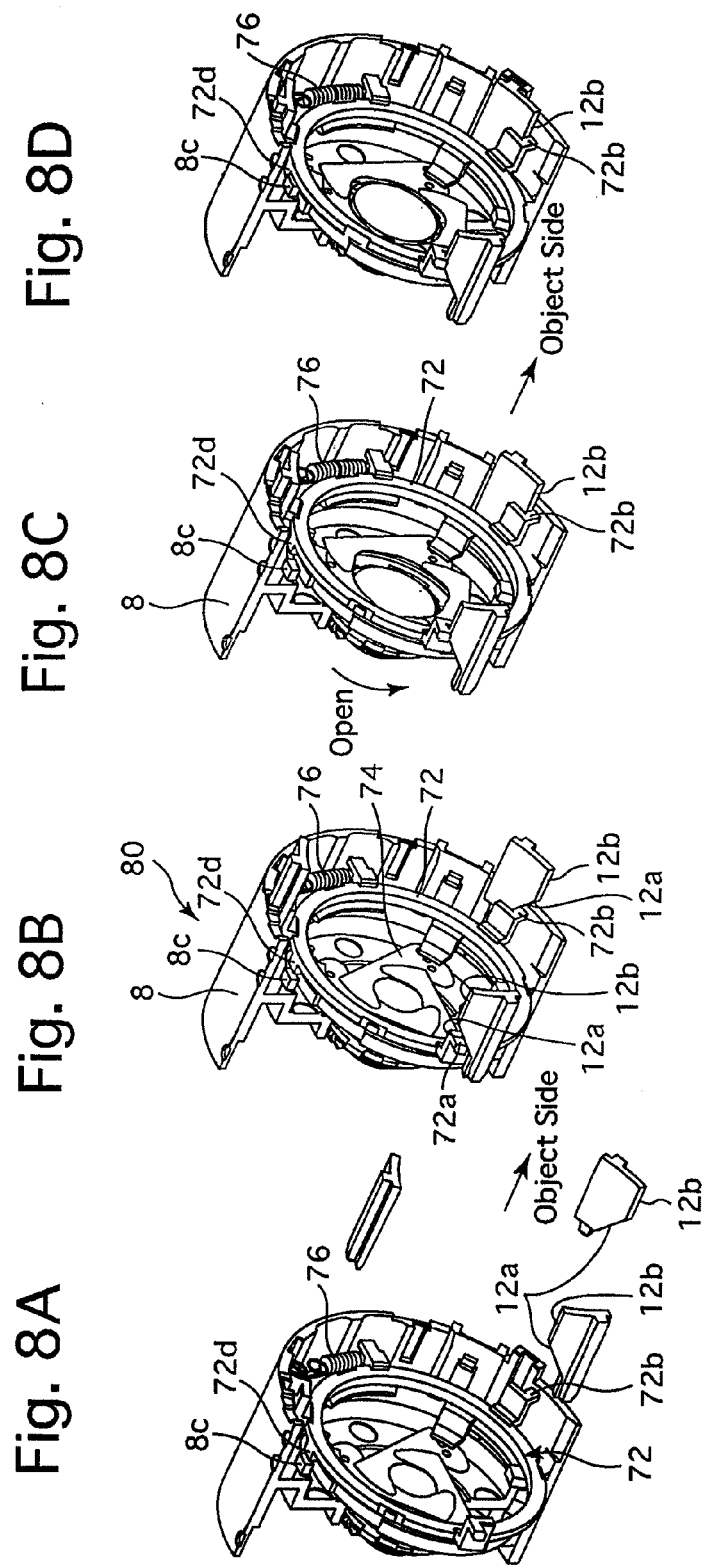

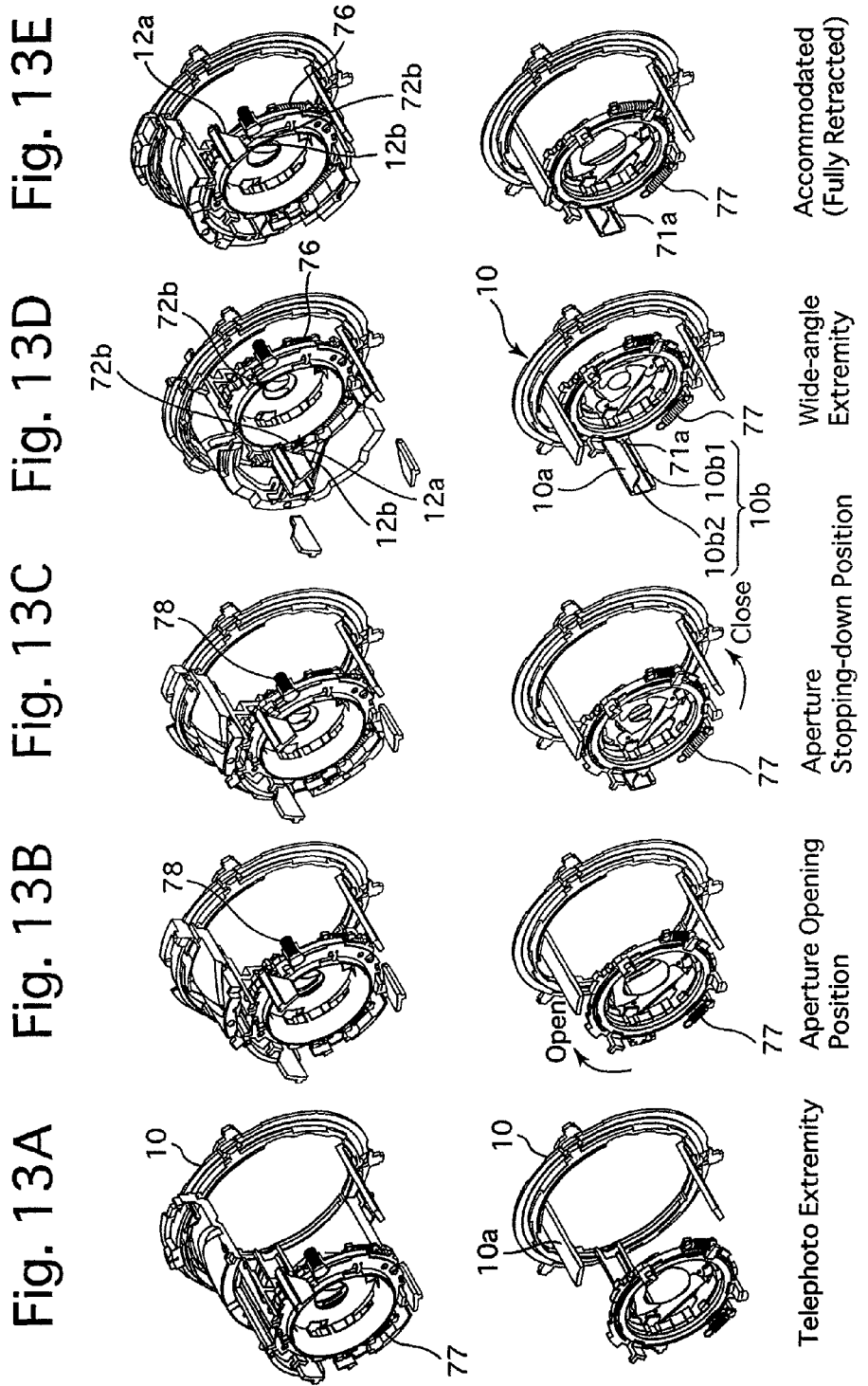

RETRACTABLE ZOOM LENS HAVING A VARIABLE APERTURE-STOP MECHANISM

BACKGROUND OF THE INVENTION

1. Field of the Invention

The present invention relates to a retractable zoom lens having a variable aperture-stop mechanism for varying a full-aperture F-number in accordance with the focal length of the zoom lens.

2. Description of the Related Art

In zoom lenses (zoom lens barrels) for compact cameras which include a lens shutter, specifically in such zoom lenses with a high zoom ratio, the maximum aperture size is varied in accordance with variations in the focal length of the zoom lens since harmful rays of light need to be shut out at the wide-angle extremity and the full-aperture F-number (full-aperture F value) needs to be reduced at the telephoto extremity.

Variable aperture-stop mechanisms for making the aperture size adjustable are generally thick (large in size) in the optical axis direction, which is conventionally an obstacle to reduction in length of a retractable type of lens in its fully retracted state (accommodated state). In addition, although a multi-function diaphragm control mechanism that is a combination of a shutter and a variable aperture stop is known in the art, both the mechanical structure and the electrical control system of such a multi-function diaphragm control mechanism are complicated because each of the shutter and the variable aperture stop needs to be controlled with precision. Accordingly, it is costly to adopt such a multi-function diaphragm control mechanism.

SUMMARY OF THE INVENTION

The present invention provides a retractable zoom lens having a variable aperture-stop mechanism which makes it possible to perform an aperture-size varying operation (aperture-size increasing/reducing operation) when the zoom lens is in the zooming range and an aperture-size varying operation (aperture-size increasing operation) when the zoom lens is accommodated, without increasing size of the variable aperture-stop mechanism (specifically the length thereof in the optical axis direction) nor complicating the structure of the variable aperture-stop mechanism.

According to an aspect of the present invention, a zoom lens is provided, including a zoom optical system including movable lens groups for zooming which are moved between a ready-to-photograph position in a zooming range and an accommodated position behind the ready-to-photograph position in an optical axis direction, one of the movable lens groups serving as an aperture-control lens group; a variable aperture-stop mechanism which is positioned one of in front of and behind the aperture-control lens group and is movable relative to the aperture-control lens group in the optical axis direction, the variable aperture-stop mechanism including a plurality of aperture blades, a base member which supports the plurality of aperture blades so as to allow each of the plurality of aperture blades to rotate freely, and an opening/closing ring which rotates relative to the base member, forward and reverse rotations of the opening/closing ring causing the plurality of aperture blades to rotate to thereby vary a size of an adjustable aperture formed by the plurality of aperture blades; a first rotation imparting member, which rotates the opening/closing ring by a relative movement between the variable aperture-stop mechanism and the first rotation imparting member in the optical axis direction so as to hold the adjustable aperture at a small aperture size when the aperture-control lens group moves in the optical axis direction between a wide-angle extremity position thereof and a position in a vicinity of the wide-angle extremity position in the zooming range; and a second rotation imparting member, which rotates the opening/closing ring by a relative movement between the variable aperture-stop mechanism and the second rotation imparting member in the optical axis direction so as to open and hold the adjustable aperture at a large aperture size when the aperture-control lens group moves in the optical axis direction from the wide-angle extremity position in the optical axis direction to the accommodated position. The aperture-control lens group is partly positioned in the adjustable aperture held at the large aperture size when the aperture-control lens group is positioned in the accommodated position.

It is desirable for the first rotation imparting member to impart a rotational force onto the opening/closing ring via another rotating ring, and for the second rotation imparting member to impart a rotational force directly onto the opening/closing ring.

It is desirable for the another rotating ring to be connected with the opening/closing ring via a spring in a manner to rotate the opening/closing ring together with the another rotating ring when a rotational motion is imparted onto the another rotating ring, and to allow the opening/closing ring to solely rotate when a rotational force is imparted onto the opening/closing ring.

It is desirable for each aperture blade of the plurality of aperture blades to be biased to rotate in a direction to open the adjustable aperture.

It is desirable for the zoom lens to include a cam ring which moves the movable lens groups in the optical axis direction by forward and reverse rotations of the cam ring, wherein one and the other of the forward and reverse rotations of the cam ring cause each of the movable lens groups to move from the accommodated position to a telephoto extremity position via a wide-angle extremity position and from the telephoto extremity position to the accommodated position via the wide-angle extremity position, respectively.

It is desirable for the aperture-control lens group and the variable aperture-stop mechanism to be supported by a single moving frame.

It is desirable for the first rotation imparting member to guide the single moving frame linearly in the optical axis direction.

It is desirable for the opening/closing ring to include a radial projection, and for the first rotation imparting member to include at least one linear guide bar, which guides the single moving frame linearly in the optical axis direction; a rotation control groove, in which the radial projection of the opening/closing ring is engaged, being formed on the linear guide bar to control rotational position of the opening/closing ring.

It is desirable for the second rotation imparting member to be positioned in front of the variable aperture-stop mechanism, and for the second rotation imparting member to linearly move toward and away from the opening/closing ring in the optical axis direction when the each of the movable lens groups is moved between the ready-to-photograph position in the zooming range and the accommodated position.

It is desirable for the opening/closing ring to include at least one projection. The second rotation imparting member includes at least one first surface which extends in the optical axis direction, and at least one second surface which extends obliquely with respect to both the optical axis direction and a circumferential direction of the second rotation imparting member. The first surface and the second surface respectively come into sliding contact with the projection of the opening/closing ring to control a rotational position of the opening/closing ring when the each of the movable lens groups is moved to the accommodated position.

It is desirable for the single moving frame to move in the optical axis direction when a zooming operation is performed.

It is desirable for the aperture-control lens group to be positioned between a frontmost lens group and a rearmost lens group of the movable lens groups.

According to the present invention, in a retractable zoom lens in which the variable aperture-stop mechanism varies (increases/reduces) the aperture size thereof when the zoom lens is in the zooming range and in which the variable aperture-stop mechanism increases the aperture size thereof to make a movable lens group of the zoom lens partly positioned in the aperture of the variable aperture-stop mechanism when the zoom lens is in the accommodated position, the aperture size of the variable aperture-stop mechanism is varied from a large size to a small size (or from a small size to a large size) by rotating the opening/closing ring of the variable aperture-stop mechanism via either the first rotation imparting member when the zoom lens is in the zooming range or the second rotating imparting member when the zoom lens is accommodated. This structure improves the degree of freedom in design and neither brings about an increase in size of the variable aperture-stop mechanism (especially the length thereof in the optical axis direction) nor complicates the structure of the variable aperture-stop mechanism.

The present disclosure relates to subject matter contained in Japanese Patent Application No. 2009-154729 (filed on Jun. 30, 2009) which is expressly incorporated herein by reference in its entirety.

BRIEF DESCRIPTION OF THE DRAWINGS

The present invention will be described below in detail with reference to the accompanying drawings in which:

FIGS. 8A, 8B, 8C and 8D are front perspective views of elements associated with a variable aperture-stop mechanism incorporated in the zoom lens barrel, showing different operational states of the variable aperture-stop mechanism;

FIGS. 12A, 12B and 12C are front perspective views of the second lens group moving frame, the variable aperture stop sub-assembly and the retaining ring that are shown in FIG. 11, wherein FIG. 12A shows a state where the variable aperture stop sub-assembly has been inserted into the second lens group moving frame but the retaining ring is not yet inserted into the second lens group moving frame following the insertion of the variable aperture stop sub-assembly, FIG. 12B shows a state where both the variable aperture stop sub-assembly and the retaining ring have been inserted into the second lens group moving frame but the retaining ring is not yet rotated to the lock position thereof, and FIG. 12C shows a state where both the variable aperture stop sub-assembly and the retaining ring have been inserted into the second lens group moving frame and the retaining ring has been rotated to the lock position thereof;

FIGS. 13A, 13B, 13C, 13D and 13E are front perspective views of some elements of the zoom lens barrel, showing a sequence of operations of the variable aperture-stop mechanism when it moves between the telephoto extremity in the zooming range and the accommodated position via the wide-angle extremity.

DESCRIPTION OF THE PREFERRED EMBODIMENT

Figure 1:
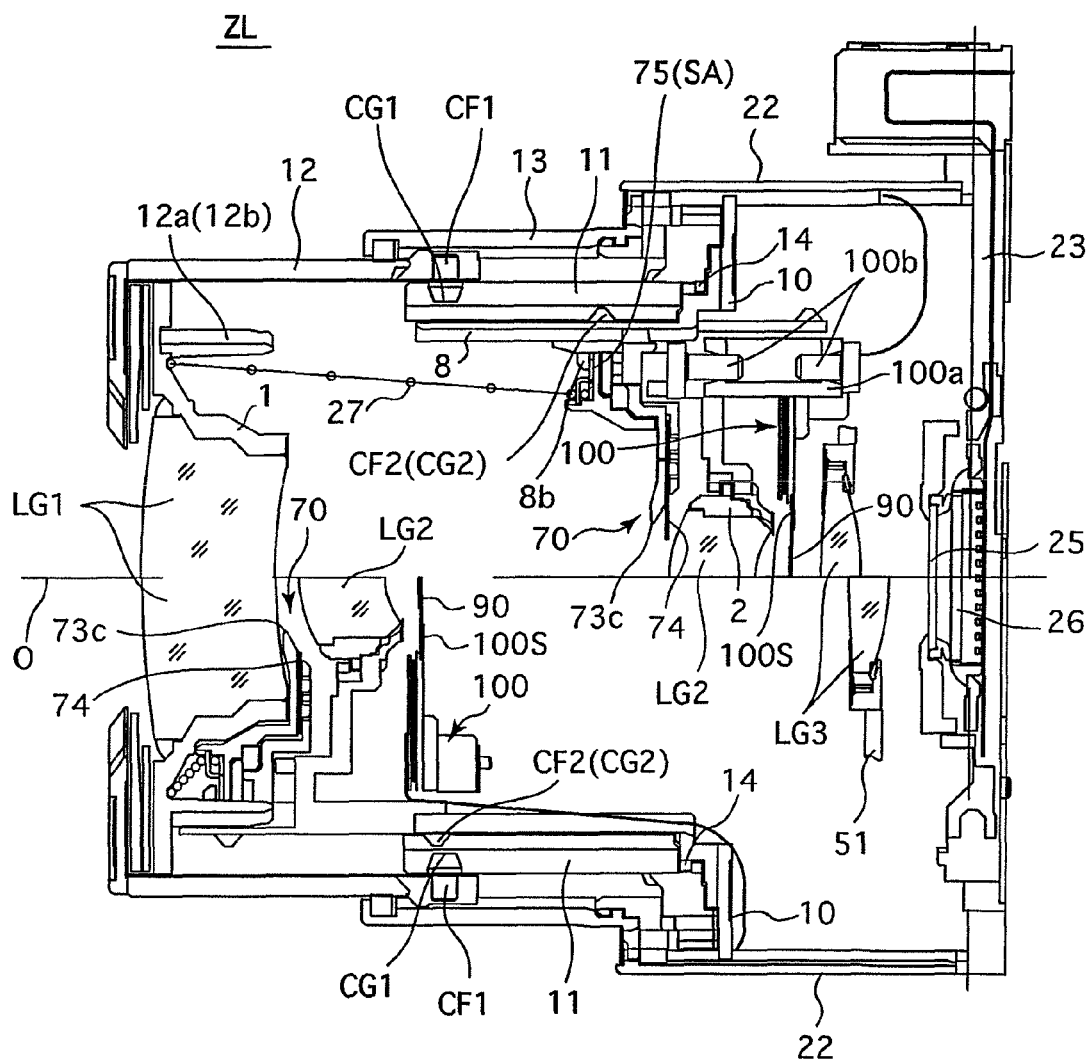
FIG. 1 is a cross sectional view of an embodiment of a zoom lens barrel of a compact digital camera according to the present invention in a ready-to-photograph state within the zooming range (more specifically, the upper half and the lower half of the zoom lens barrel show the zoom lens barrel set at the wide-angle extremity and the telephoto extremity, respectively)

The brief description of the overall structure of an embodiment of a zoom lens barrel (zoom lens) ZL according to the present invention will be hereinafter discussed with reference to FIGS. 1 through 5. A photographing optical system installed in the zoom lens barrel ZL is provided with a first lens group LG1, a second lens group LG2, a third lens group (focusing lens group) LG3, a low-pass filter (optical filter) 25 and an image sensor 26, in that order from the object side. In the following descriptions, the optical axis direction refers to a direction along or parallel to a photographing optical axis O of this photographing optical system.

The low-pass filter 25 and the image sensor 26 are integrated as a single unit that is fixed to an image sensor holder 23, and the image sensor holder 23 is fixed to the back of a housing 22 of the zoom lens barrel ZL.

The zoom lens barrel ZL is provided with a third lens group frame 51 which holds the third lens group LG3. The third lens group frame 51 is supported by the housing 22 to be movable in the optical axis direction relative to the housing 22. The third lens group frame 51 is driven by an AF motor 160 that is supported by the housing 22 (see FIG. 3).

Figure 3:
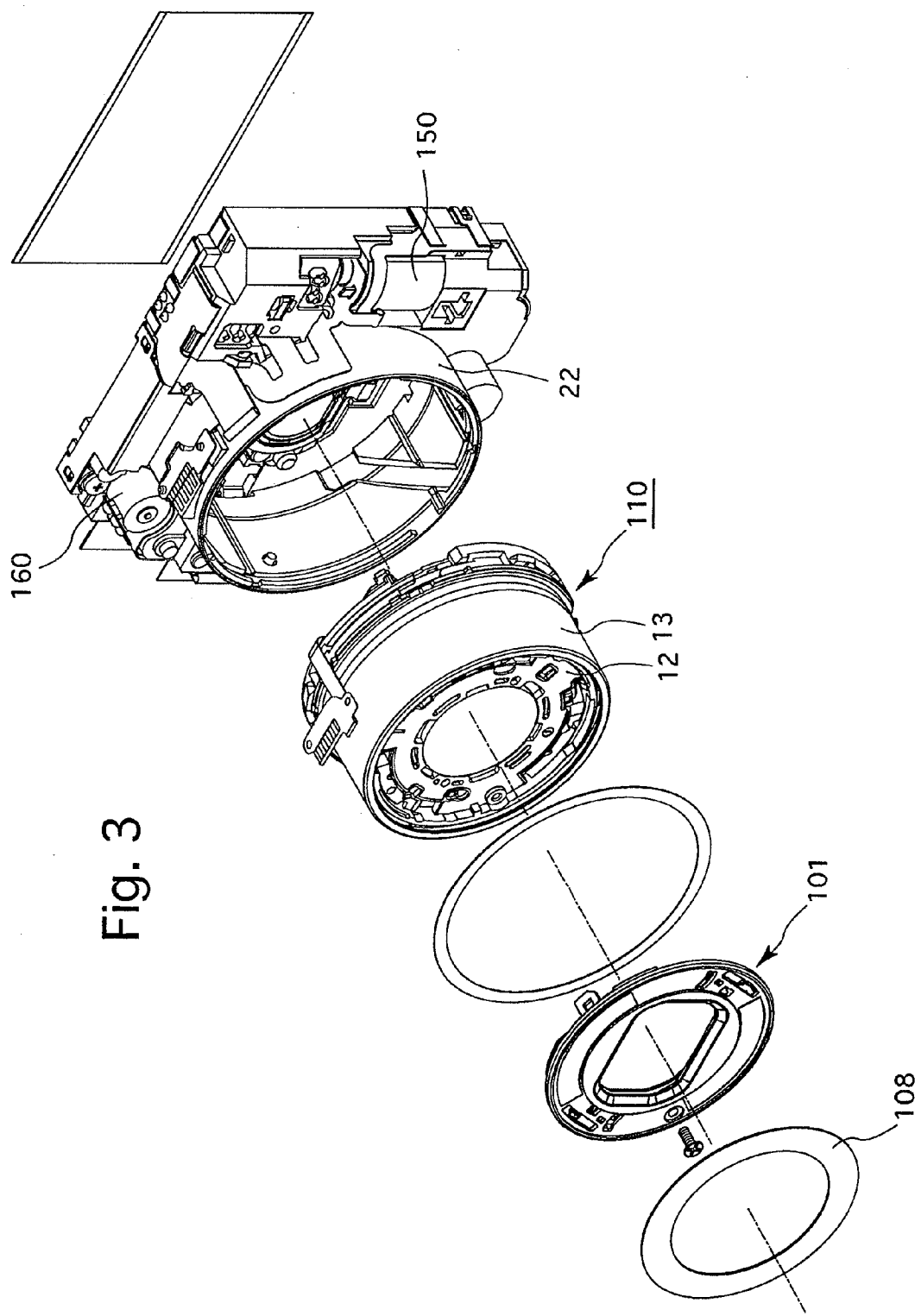
FIG. 3 is an exploded front perspective view of elements of the zoom lens barrel.

As shown in FIG. 3, the zoom lens barrel ZL is provided inside the housing 22 with a movable lens unit (cam-ring-incorporated movable unit) 110 which is supported by the housing 22 to be movable in the optical axis direction. The zoom lens barrel ZL is provided at the front end of the movable lens unit 110 with a barrier unit 101 for protection of the front surface of the first lens group LG1 from being damaged when the zoom lens barrel ZL is not in use. The zoom lens barrel ZL is provided at the front end thereof with a decorative ring 108 fixed to the front of the barrier unit 101.

Figure 4:
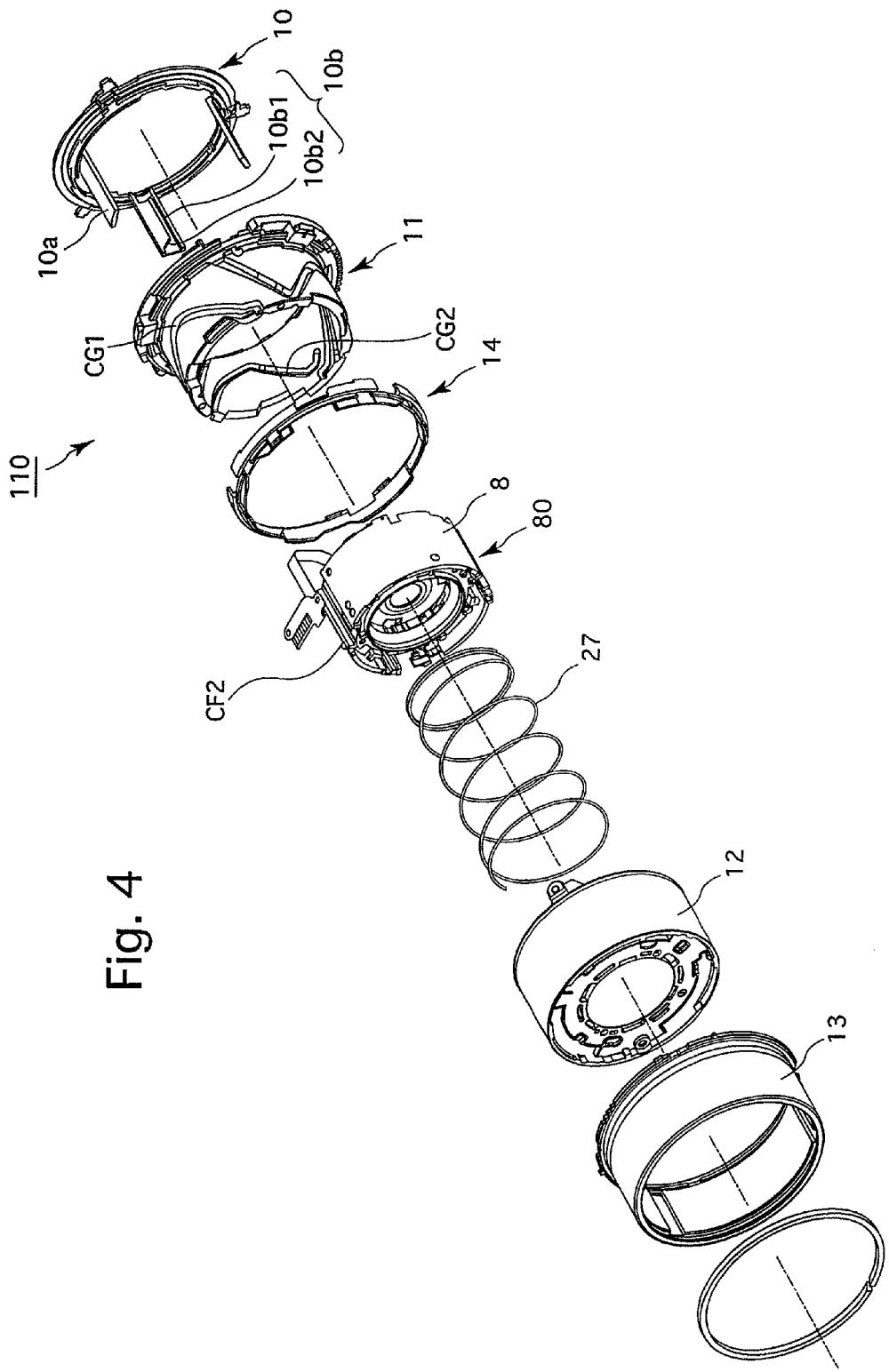
FIG. 4 is an exploded front perspective view of elements of the zoom lens barrel.
Figure 5:
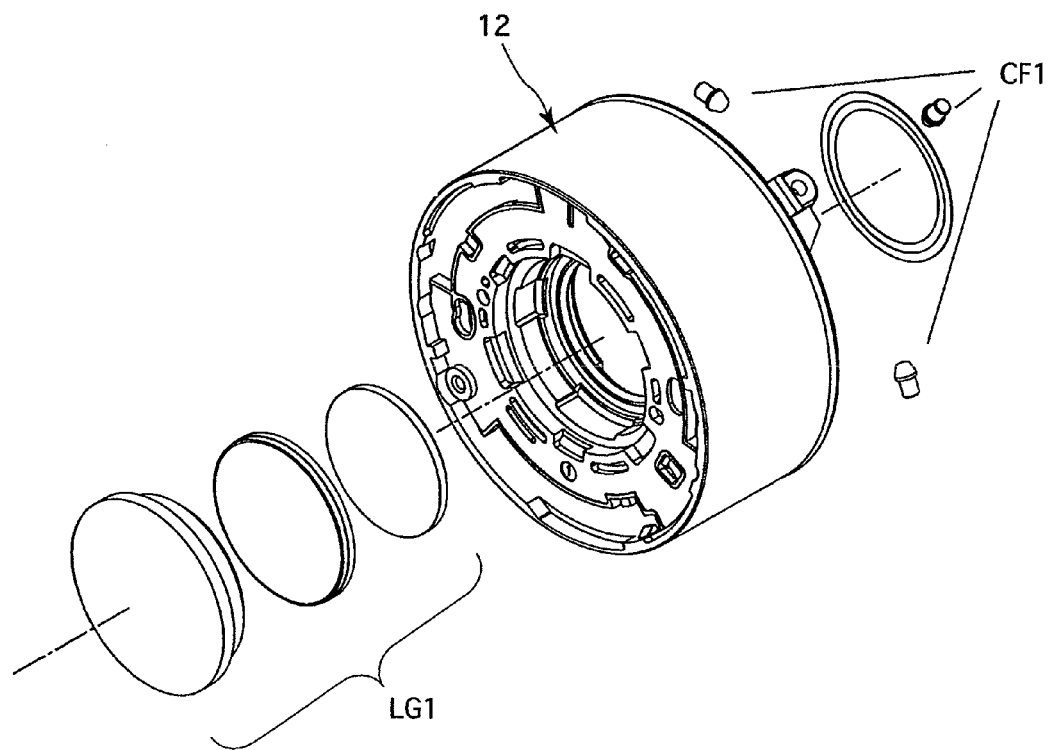
FIG. 5 is an exploded front perspective view of elements of the zoom lens barrel.

As shown in FIG. 4, the movable lens unit 110 is provided with a linear guide ring 10 (for linearly guiding the second lens group LG2), a cam ring 11, a cam-ring connecting ring 14 and a first advancing barrel (linear guide ring for guiding the first lens group) 13. The cam ring 11 is rotated by the driving force of a zoom motor 150 (see FIG. 3). The cam ring 11 moves in the optical axis direction while rotating during movement from the lens barrel accommodated state (fully-retracted state) (shown in FIG. 2) until a ready-to-photograph state (the wide-angle extremity shown in the upper half of FIG. 1). The cam ring 11 rotates at a fixed position with respect to the optical axis direction when the zoom lens barrel ZL is in the zooming range (between the wide-angle extremity shown in the upper half of FIG. 1 and the telephoto extremity shown in the lower half of FIG. 1) in a ready-to-photograph state.

The first advancing barrel 13 is positioned in front the cam ring 11 (specifically, a combination of the cam ring 11 and the cam-ring connecting ring 14) and the linear guide ring 10 is position behind the cam ring 11. Each of the linear guide ring 10 and the first advancing barrel 13 is guided linearly in the optical axis direction with respect to the housing 22, and is connected to the cam ring 11 to be rotatable relative to the cam ring 11 and to move with the cam ring in the optical axis direction.

The cam-ring connecting ring 14 is an element for connecting the first advancing barrel 13 and the cam ring 11 to each other (by a bayonet coupling) so that the first advancing barrel 13 and the cam ring 11 can rotate freely relative to each other and integrally move in the optical axis direction.

Figure 6:
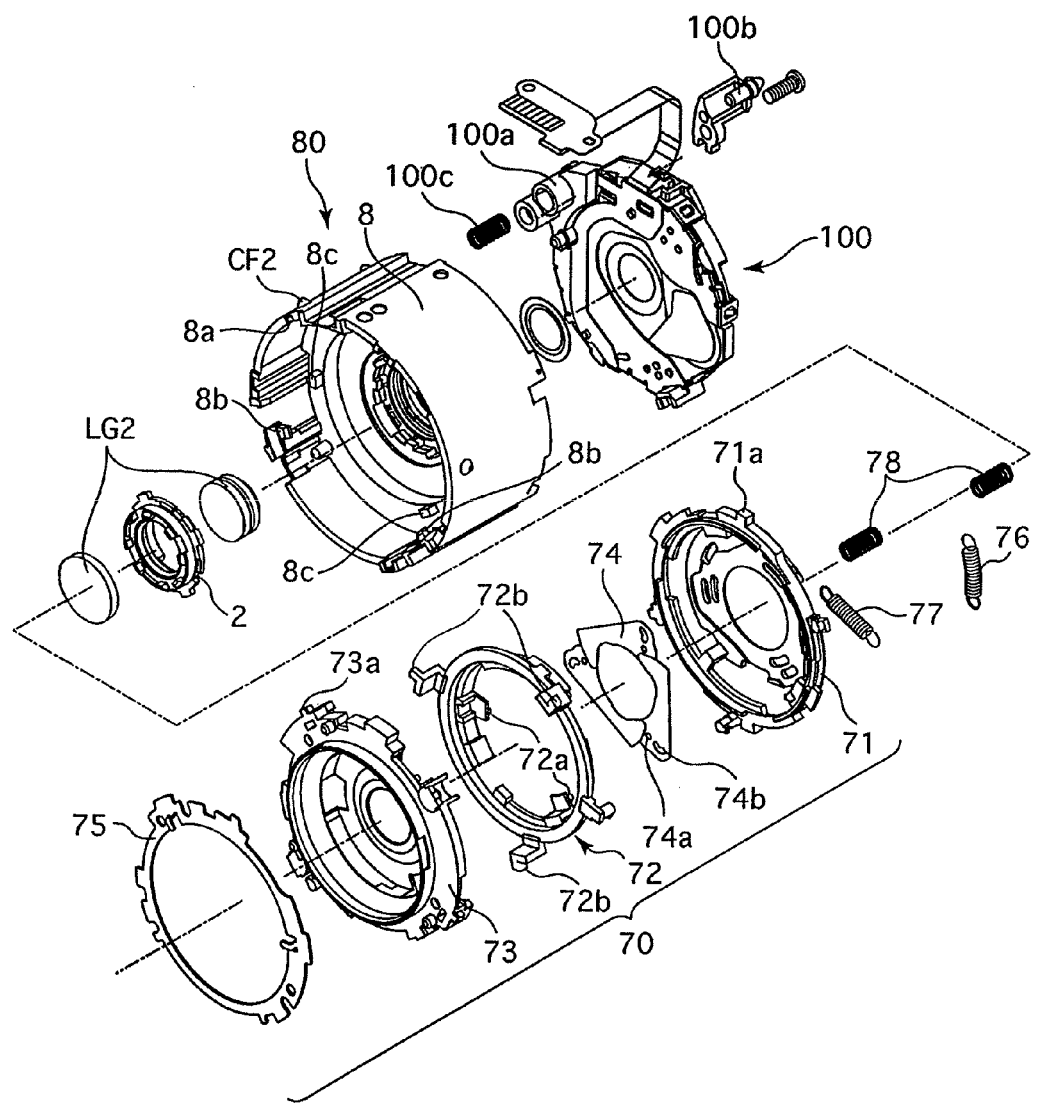
FIG. 6 is an exploded front perspective view of elements of the zoom lens barrel.
Figure 7:
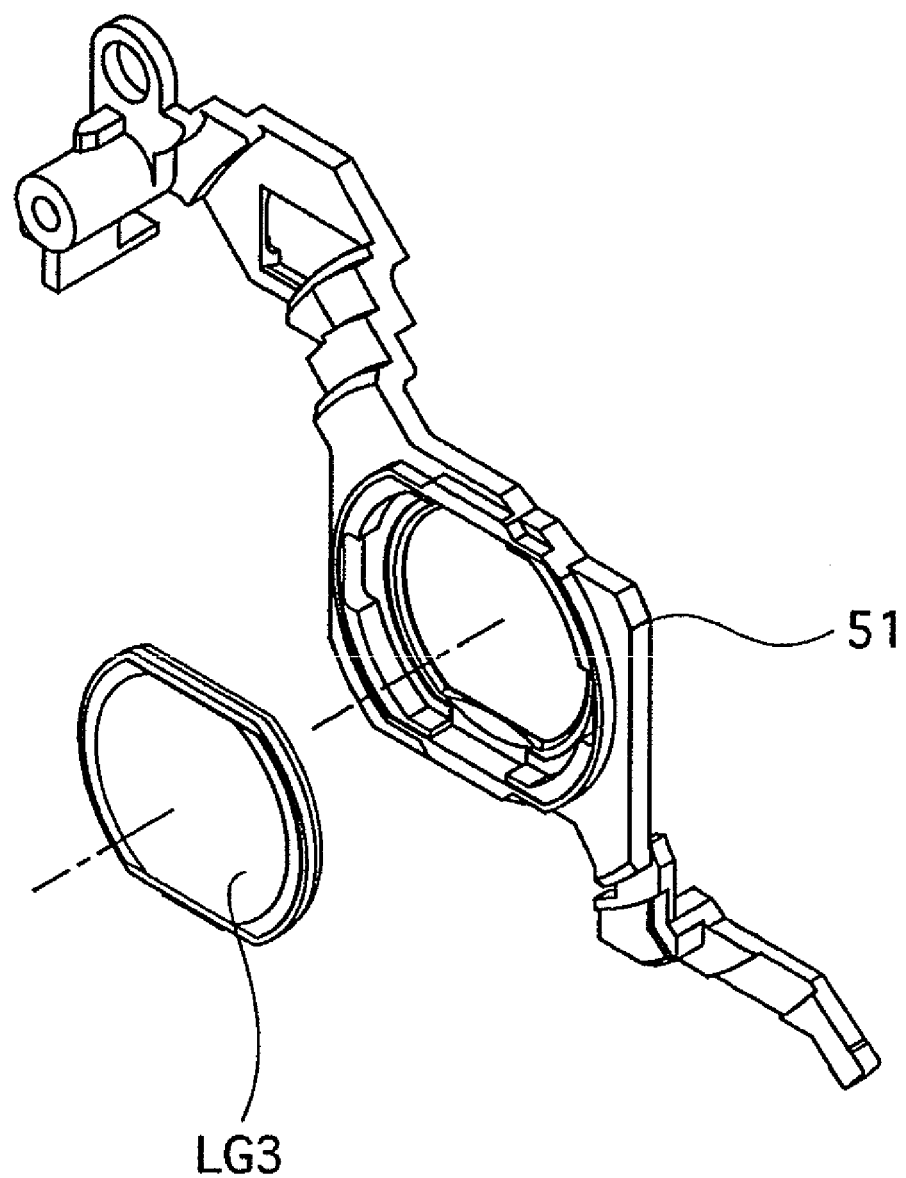
FIG. 7 is an exploded front perspective view of elements of the zoom lens barrel.

The zoom lens barrel ZL is provided radially inside of the cam ring 11 with a second lens group holding unit 80. The linear guide ring 10 guides the second lens group holding unit 80 linearly in the optical axis direction so that the second lens group holding unit 80 can move in the optical axis direction relative to the linear guide ring 10. As shown in FIG. 6, the second lens group holding unit 80 is provided with a second lens group moving frame 8, and is provided inside the second lens group moving frame 8 with a second lens group holding frame 2 which holds the second lens group LG2. The second lens group LG2 is the smallest in diameter among all the lens groups of the photographing optical system. The second lens group holding unit 80 is provided, in front of and behind the second lens group holding frame 2 in the optical axis direction, with a variable aperture-stop mechanism 70 and a shutter unit 100, respectively, each of which is supported by the second lens group moving frame 8 to be movable in the optical axis direction relative to the second lens group moving frame 8. The zoom lens barrel ZL is provided, in the immediate vicinity of a set of shutter blades 100S contained in the shutter unit 100, with an ND filter 90 (see FIG. 1) for exposure control that is provided as a replacement for a mechanical diaphragm mechanism. In the present embodiment of the zoom lens barrel, the second lens group LG2 that is held by the second lens group holding unit 80 serves as a light-quantity-control lens group.

The zoom lens barrel ZL is provided immediately inside the first advancing barrel 13 with a second advancing barrel 12 which advances and retracts in the optical axis direction relative to the first advancing barrel 13. The barrier unit 101 is fixed at the front end of the second advancing barrel 12. The first advancing barrel 13, which is guided linearly in the optical axis direction with respect to the housing 22, guides the second advancing barrel 12 linearly in the optical axis direction so that the second advancing barrel 12 can move in the optical axis direction relative to the first advancing barrel 13. The zoom lens barrel ZL is provided inside the second advancing barrel 12 with a first lens group holding frame 1 which holds the first lens group LG1 (see FIG. 5), so that the second advancing barrel 12 supports the first lens group LG1 via the first lens group holding frame 1.

The second advancing barrel 12 is provided with a plurality of first cam followers CF1 (see FIGS. 1, 2 and 5), each of which projects radially inwards, for moving the first lens group LG1. Each first cam follower CF1 is slidably engaged in an associated first-lens-group control cam groove CG1 formed on an outer peripheral surface of the cam ring 11. Since the second advancing barrel 12 is guided linearly in the optical axis direction via the first advancing barrel 13, rotation of the cam ring 11 causes the second advancing barrel 12 (i.e., the first lens group LG1) to move in the optical axis direction in a predetermined moving manner in accordance with the contours of the first-lens-group control cam grooves CG1.

The second lens group moving frame 8 is provided on an outer peripheral surface thereof with a plurality of second cam followers CF2, each of which projects radially outwards to be slidably engaged in an associated second-lens-group control cam groove CG2 formed on an inner peripheral surface of the cam ring 11. Since the second lens group moving frame 8 is guided linearly in the optical axis direction via the linear guide ring 10, rotation of the cam ring 11 causes the second lens group moving frame 8 (i.e., the second lens group LG2) to move in the optical axis direction in a predetermined moving manner in accordance with the contours of the second-lens-group control cam grooves CG2.

The zoom lens barrel ZL is provided between the second lens group moving frame 8 and the second advancing barrel 12 with an inter-lens-group biasing spring 27, in the form of a compression spring which biases the second lens group moving frame 8 and the second advancing barrel 12 in opposite directions away from each other.

The shutter unit 100 is provided with a guide cylinder 100a which is formed integral with the shutter unit 100 to extend in the optical axis direction. The second lens group moving frame 8 is provided with a pair of (front and rear) guide pins 100b (see FIGS. 1 and 6) which are inserted into the guide cylinder 100a from the front and the rear, respectively. The guide pin 100b which appears in FIG. 6 is the rear guide pin 100b which is fixed to the second lens group moving frame 8 by a set screw. A compression coil spring 100c (see FIG. 6) is fitted on the front guide pin 100b to bias the shutter unit 100 rearward. With this guide mechanism, the shutter unit 100 is positioned at a predetermined position spaced farthest apart from the second lens group moving frame 8 in a ready-to-photograph state, and moves close to each of the second lens group LG2 and the third lens group LG3 when the zoom lens barrel ZL is accommodated (fully retracted) (see FIGS. 1 and 2). The set of shutter blades 100S of the shutter unit 100 can be controlled to fully open and shut upon a shutter release in the zooming range and fully open in the lens barrel accommodated state.

Figure 9A:
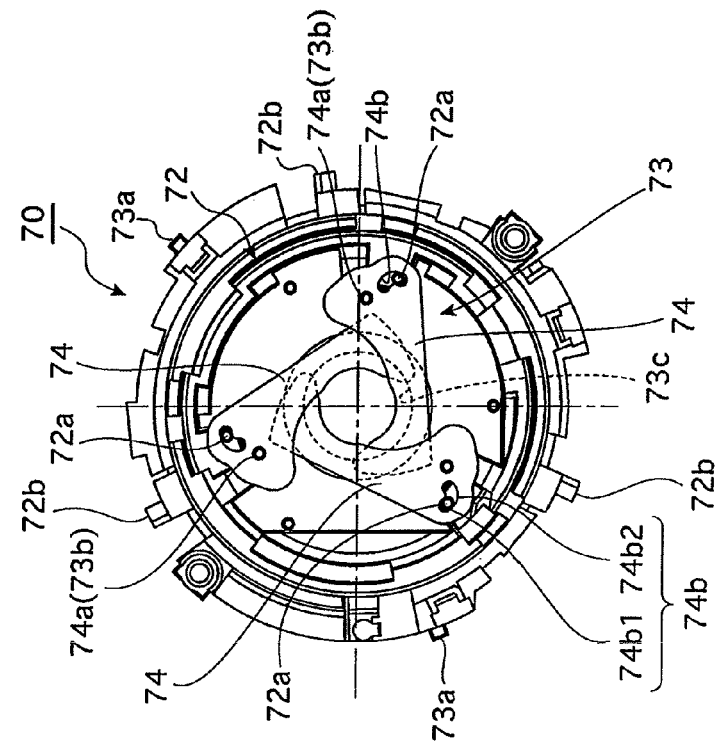
FIGS. 9A and 9B are rear elevational views of the variable aperture-stop mechanism, showing different operational states thereof.
Figure 9B:
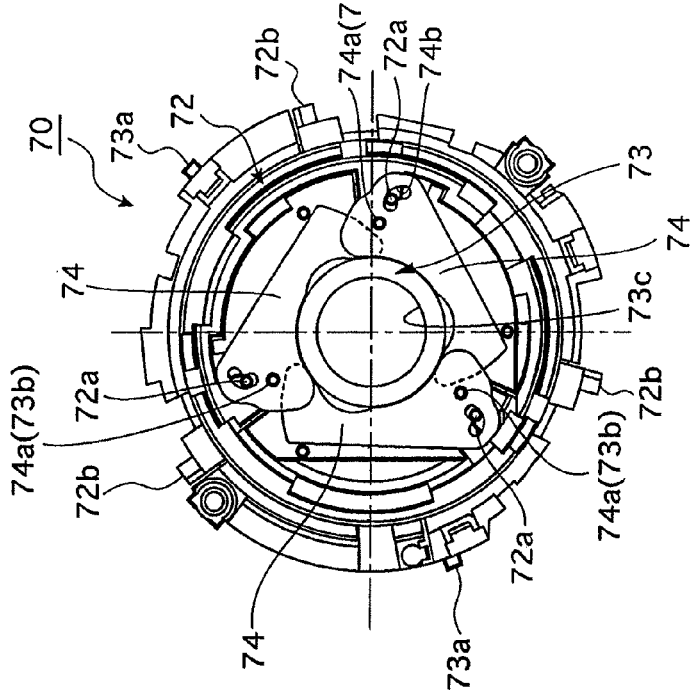
Figure 10:
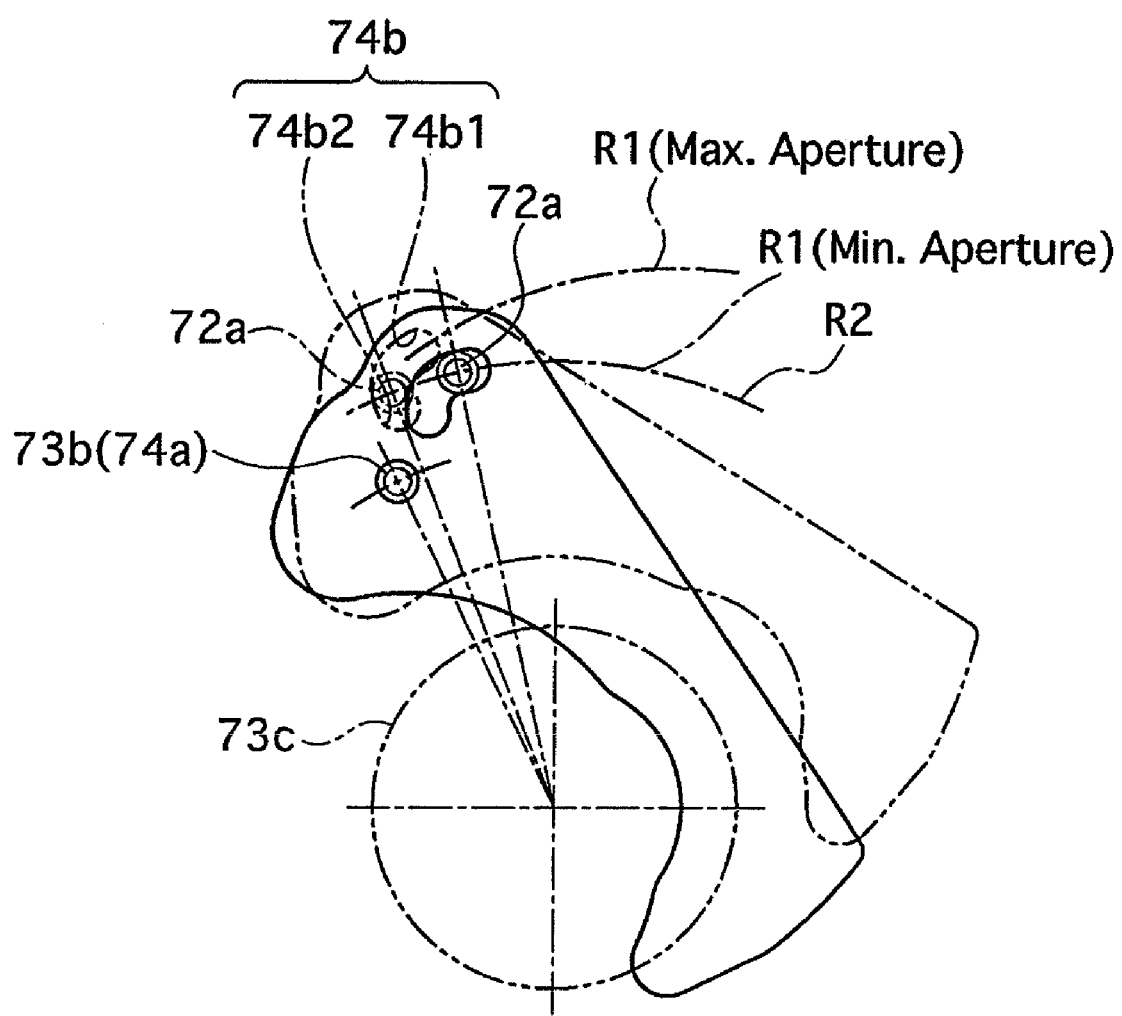
FIG. 10 is a rear elevational view of an aperture blade (shown by solid or two-dot chain lines) and a fixed circular aperture (shown by a two-dot chain line), illustrating variations in aperture size of the variable aperture-stop mechanism.

As shown in FIG. 6, the variable aperture-stop mechanism 70 is provided with a base member 73, an opening/closing ring 72, a set of three aperture blades 74 and a zoom rotational ring 71. As can be clearly seen in FIGS. 9A, 9B and 10, three rotational center projections 73b which are fitted into three rotational center holes 74a formed through the three aperture blades 74 project from the base member 73, respectively. Each aperture blade 74 is provided with an opening/closing cam groove 74b so that this opening/closing cam groove 74b and the associated rotational center hole 74a are formed as a pair. Three opening/closing pins 72a project from the opening/closing ring 72 to be engaged in the three opening/closing grooves 74b of the set of three aperture blades 74, respectively. Rotating the opening/closing ring 72 relative to the base plate 73 causes the size of the aperture formed by the set of three aperture blades 74 to change. Each opening/closing cam groove 74b is provided with an aperture closing section 74b1 and an aperture opening section 74b2. The aperture closing section 74b1 has both a circumferential directional component (in the circumferential direction of the opening/closing ring 72) and a radial directional component (in a radial direction of the opening/closing ring 72), however, the circumferential directional component is much greater than the radial directional component. The aperture opening section 74b2 has both a circumferential directional component (in the circumferential direction of the opening/closing ring 72) and a radial directional component (in a radial direction of the opening/closing ring 72), however, the radial directional component is much greater than the circumferential directional component. When the three opening/closing pins 72a are positioned in the aperture opening sections 74b2 of the set of three aperture blades 74, respectively, a rotation of the opening/closing ring 72 at a small angle of rotation can cause the size of the aperture formed by the set of three aperture blades 74 to become maximum as shown in FIGS. 9A and 10. On the other hand, when the three opening/closing pins 72a are positioned in the aperture closing sections 74b1 of the set of three aperture blades 74, respectively, the size of the aperture formed by the set of three aperture blades is maintained minimum during rotation of the opening/closing ring 72 through a relatively large angle of rotation as shown in FIGS. 9B and 10. A large-diameter circular aperture (fixed circular aperture) 73c (see FIG. 9A), which is smaller in diameter than the maximum size of the aperture formed by the set of three aperture blades 74 and greater in diameter than the minimum size of the aperture formed by the set of three aperture blades 74, is formed in the base member 73. In this manner, by defining the maximum size of the aperture of the variable aperture-stop mechanism 70 by the large-diameter circular aperture 73c, not by the set of three aperture blades 74, the maximum size of the aperture of the variable aperture-stop mechanism 70 can be controlled with high precision. On the other hand, controlling the minimum aperture of the variable aperture-stop mechanism 70 through the use of the closing section 74b1 (the circumferential component of which is much greater in magnitude than the radial component thereof) of each opening/closing cam groove 74b makes it possible to control the size of the minimum aperture of the variable aperture-stop mechanism 70 with high precision. Namely, as shown in the enlarged view in FIG. 10, in a state where the aperture formed by the set of three aperture blades 74 (shown by solid lines in FIGS. 9B and 10) is small in size, the three opening/closing pins 72a are positioned in the aperture closing sections 74b1 of the set of three aperture blades 74, respectively, while a central line R1 of the aperture closing section 74b1 of each aperture blade 74 substantially coincides with a rotational moving path R2 of the axis of the associated opening/closing pin 72a about the rotational axis thereof (which corresponds to the optical axis O), and accordingly, the aperture formed by the set of three aperture blades 74 can be maintained at a correct small size (minimum size) even if each opening/closing pin 72a (the opening/closing ring 72) has some degree of error in angle of rotation thereof.

Although the set of three aperture blades 74 of the variable aperture-stop mechanism 70 have the three rotational center holes 74a, respectively, while the base member 73 has the three rotational center projections 73b to correspond to the three rotational center holes 74a in the present embodiment of the variable aperture-stop mechanism, this hole-projection relationship can be reversed. Namely, it is possible that three rotational center holes corresponding to the three rotational center holes 74a be formed in the base member 73 while three rotational center projections corresponding to the rotational center projections 73b be formed on the set of three aperture blades 74. Likewise, although the three opening/closing cam grooves 74b are respectively formed in the set of three aperture blades 74 while the three opening/closing pins 72a are formed on the opening/closing ring 72 in the present embodiment of the variable aperture-stop mechanism, it is possible that three opening/closing cam grooves corresponding to the three opening/closing cam grooves 74b be formed in the opening/closing ring 72 while three opening/closing pins corresponding to the three opening/closing pins 72a be formed on the set of three aperture blades 74, respectively.

In short, the base member 73, the opening/closing ring 72 and the set of three aperture blades 74 constitute an aperture blade opening/closing mechanism, and the adjustable aperture formed by the set of three aperture blades 74 can change between the maximum aperture and the minimum aperture by rotating the opening/closing ring 72 relative to the base member 73. The maximum aperture size of the adjustable aperture is greater than the diameter of the circular aperture 73c and the minimum aperture size of the adjustable aperture is smaller than the diameter of the diameter of the circular aperture 73c. In addition, the set of three aperture blades 74 is positioned closer to the second lens group LG2 than the circular aperture 73c.

The zoom rotational ring 71 of the variable aperture-stop mechanism 70 prevents the opening/closing ring 72 from coming off with the opening/closing ring 72 being held between the zoom rotational ring 71 and the base member 73, and is coupled to the base member 73 by bayonet coupling in a manner to be rotatable relative to the base member 73 through a predetermined angle of rotation. The variable aperture-stop mechanism 70 is provided with an extension coil spring 76 which is extended to be installed between the zoom rotational ring 71 and the opening/closing ring 72. The extension coil spring 76 makes the opening/closing ring 72 rotate with the zoom rotational ring 71 when a rotational force is applied to the zoom rotational ring 71. When a rotational force in a direction to open the aperture formed by the set of three aperture blades 74 is applied to the opening/closing ring 72, the extension coil spring 76 is extended to allow the opening/closing ring 72 to rotate solely. In addition, the variable aperture-stop mechanism 70 is provided with an extension coil spring 77 which is extended to be installed between the zoom rotational ring 71 and the base member 73. The extension coil spring 77 biases the zoom rotational ring 71 in a direction to open the aperture formed by the set of three aperture blades 74.

Figure 11:
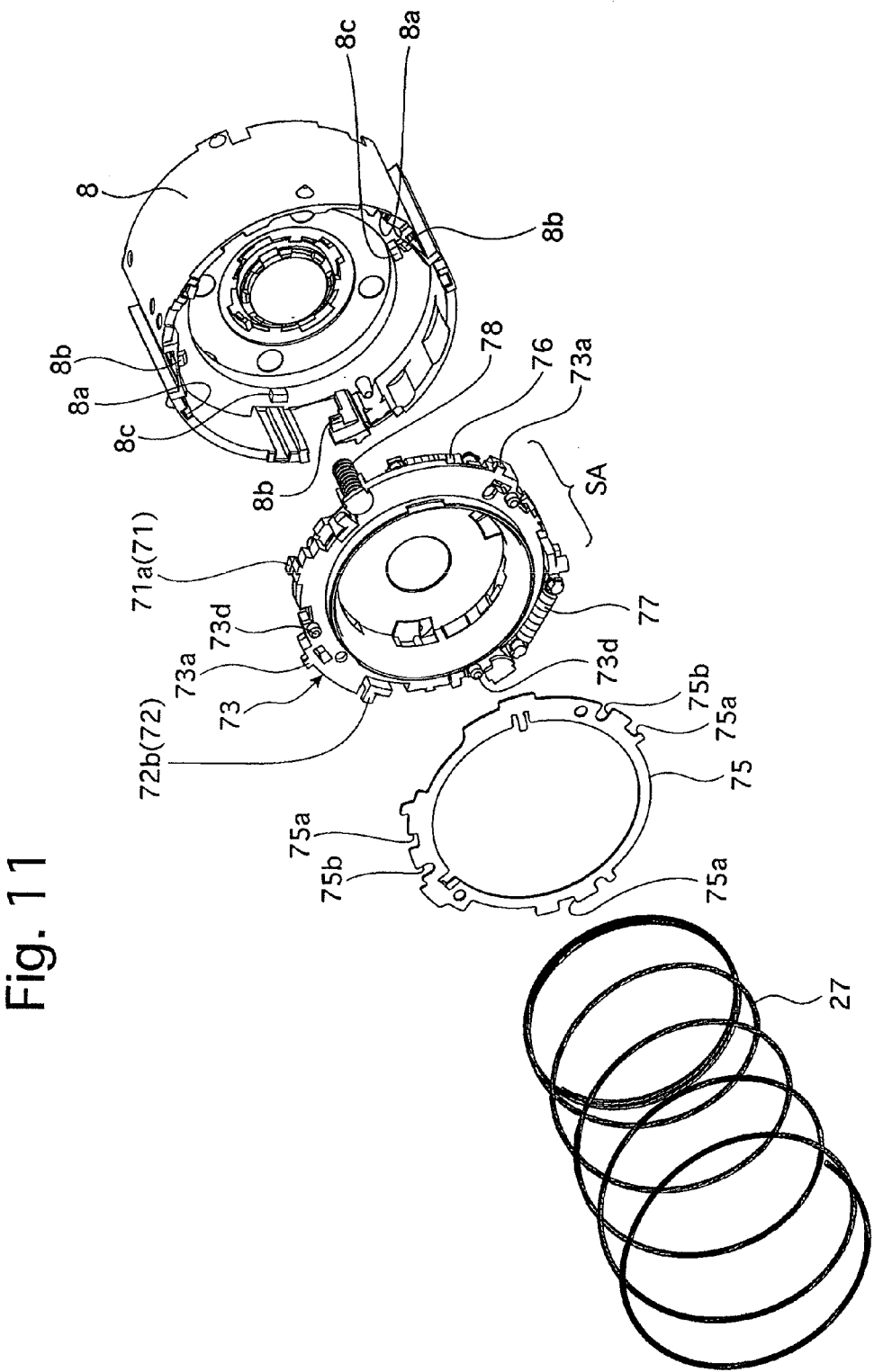
FIG. 11 is an exploded front perspective view of elements of the zoom lens barrel that include a second lens group moving frame, the variable aperture-stop mechanism (variable aperture stop sub-assembly), a retaining ring and an inter-lens-group biasing spring.

The base member 73, the opening/closing ring 72, the set of three aperture blades 74, the zoom rotational ring 71 and the two extension coil springs 76 and 77 are assembled together into a variable aperture stop sub-assembly SA as shown in FIG. 11. This variable aperture stop sub-assembly SA is inserted into the front opening of the second lens group moving frame 8 and held thereby via a retaining ring 75 as shown in FIGS. 11 and 12. The base member 73 is provided with a plurality of guide projections 73a (see FIG. 6) which project radially outwards to be slidably engaged in a plurality of linear guide grooves 8a, respectively, which are formed on an inner peripheral surface of the second lens group moving ring 8. The second lens group moving ring 8 is further provided with a plurality of retaining projections 8b which project radially inwards from a circular cylindrical wall surface at the front end opening of the second lens group moving ring 8. The retaining ring 75 is provided with a plurality of assembling grooves 75a arranged in alignment with the plurality of retaining projections 8b, respectively. The retaining ring 75 is supported by the second lens group moving ring 8 on an inner peripheral surface thereof at the front end opening of the second lens group moving ring 8 through the use of the plurality of retaining projections 8b and the plurality of assembling grooves 75a with two compression coil springs 78, for biasing the variable aperture stop sub-assembly SA forward, being installed between the base member 73 and the second lens group moving ring 8. The two compression coil springs 78 are positioned symmetrically with respect to the optical axis O. A plurality of rotation stop projections 73d project forward from the base member 73, and a plurality of U-shaped rotation stop grooves 75b in which the plurality of rotation stop projections 73d are respectively engaged are formed on the retaining ring 75. The plurality of rotation stop projections 73d and the plurality of U-shaped rotation stop grooves 75b are not respectively aligned, as viewed in the optical axis direction, when the plurality of assembling grooves 75a and the plurality of retaining projections 8b are respectively aligned, as viewed in the optical axis direction. Namely, when the plurality of rotation stop projections 73d and the plurality of U-shaped rotation stop grooves 75b are respectively aligned in the optical axis direction, the plurality of assembling grooves 75a and the plurality of retaining projections 8b are not respectively aligned in the optical axis direction.

Figure 12A:
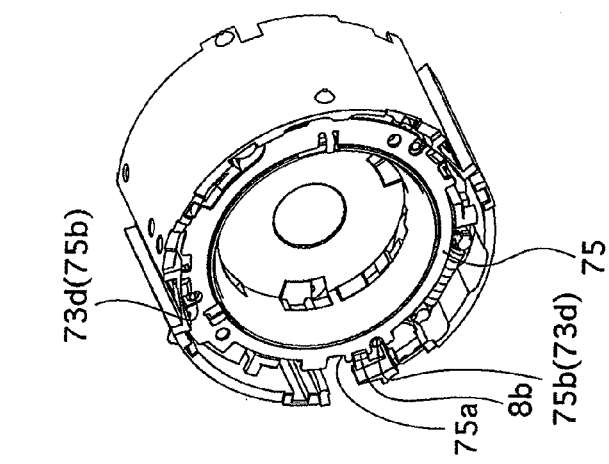
Figure 12B:
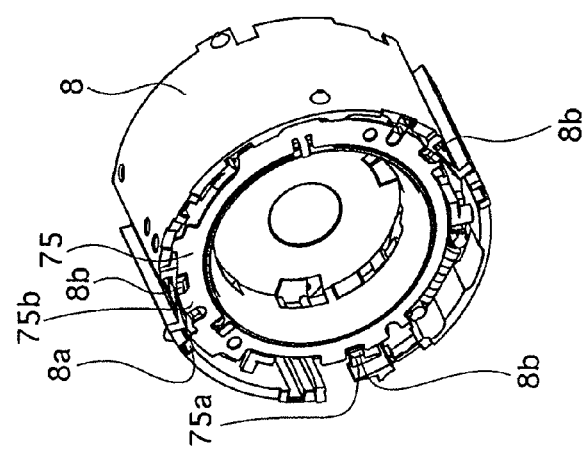
Figure 12C:
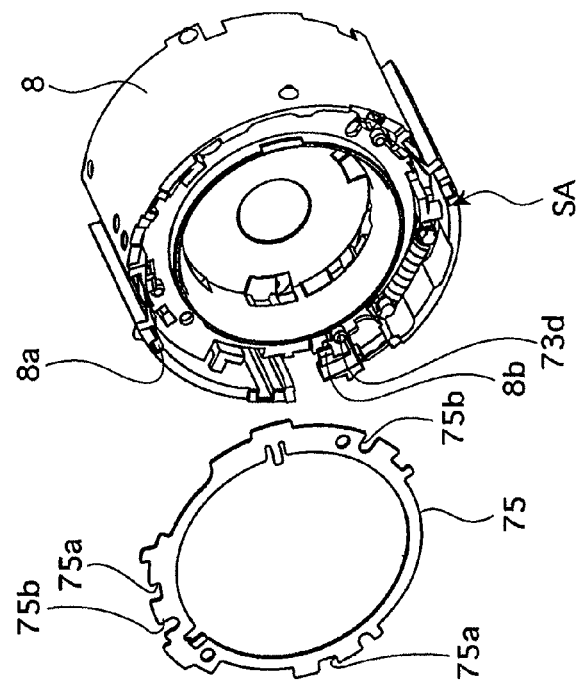

FIGS. 12A, 12B and 12C show a sequence of fitting the variable aperture stop sub-assembly SA and the retaining ring 75 into the second lens group moving frame 8. FIG. 12A shows a state where the variable aperture stop sub-assembly SA is fitted into the second lens group moving frame 8 with the plurality of guide projections 73a of the base member 73 being engaged in the plurality of linear guide grooves 8a that have end openings at the front of the second lens group moving frame 8, respectively. FIG. 12B shows a state where the retaining ring 75 is inserted into the second lens group moving frame 8 against the biasing force of the compression coil spring 78 with the plurality of assembling grooves 75a of the retaining ring 75 being aligned with the plurality of retaining projections 8b of the second lens group moving frame 8 in the optical axis direction, respectively. In this state, rotating the retaining ring 75 relative to the second lens group moving ring 8 at a small angle of rotation causes the retaining ring 75 to be partly positioned behind the plurality of retaining projections 8b, thus preventing the retaining ring 75 (the variable aperture stop sub-assembly SA) from coming off the second lens group moving ring 8. This rotation of the retaining ring 75 relative to the second lens group moving ring 8 further causes the plurality of rotation stop projections 73d of the base member 73 to engage with the plurality of U-shaped rotation stop grooves 75b of the retaining ring 75, respectively, thus preventing the retaining ring 75 from rotating. In this retained state, the retaining ring 75 (the variable aperture stop sub-assembly SA) is guided linearly in the optical axis direction relative to the second lens group moving frame 8. The engaged state between the plurality of rotation stop projections 73d of the base member 73 and the plurality of U-shaped rotation stop grooves 75b of the retaining ring 75 is stable, and there is no possibility of the variable aperture stop sub-assembly SA coming off the second lens group moving frame 8 unless the retaining ring 75 is firstly pressed into the second lens group moving frame against the biasing force of the compression coil springs 78, and subsequently rotated to bring the plurality of assembling grooves 75a into alignment with the plurality of retaining projections 8b, respectively.

Although the spring forces of the inter-lens-group biasing spring 27 and the two compression coil springs 78 are exerted on the front and the rear sides of the retaining ring 75, the sum of the spring forces of the two compression coil springs 78 is greater than the inter-lens-group biasing spring 27. Accordingly, in a normal state (in a ready-to-photograph state in the zooming range), in which no force in the optical axis direction is exerted on the variable aperture stop sub-assembly SA, the retaining ring 75 (the variable aperture stop sub-assembly SA) is held at the fully advanced position (in the state shown in FIG. 1) relative to the second lens group moving frame 8, in which the plurality of retaining projections 8b and the retaining ring 75 are in contact with each other. When the zoom lens barrel ZL is fully retracted, the variable aperture stop sub-assembly SA retreats by being pressed rearward by the second advancing barrel 12 while compressing the two compression coil springs 78, and the retaining ring 75 moves away from the plurality of retaining projections 8b (see FIG. 2).

The zoom rotational ring 71 is provided with a radial projection 71a (see FIGS. 6 and 11) for controlling the rotational position of the zoom rotational ring 71. The radial projection 71a is engaged in and disengaged from a rotation control groove 10b formed on an inner surface of a linear guide bar 10a (see FIGS. 4 and 13A through 13E) which projects forward from the linear guide ring 10. The rotation control groove 10b is provided with a linear groove 10b1 which extends in the optical axis direction and an inclined groove 10b2 which extends obliquely in a direction inclined to both the optical axis direction and the circumferential direction. When the movable lens unit 110 is positioned at or in the close vicinity of the telephoto extremity, the radial projection 71a is in a non-engaged position with respect to the rotation control groove 10b of the linear guide bar 10a. At this time, the zoom rotational ring 71 holds the aperture formed by the set of three aperture blades 74 at the maximum aperture (at this time the extension coil spring 77 is in a non-extended state); in addition, in the wide-angle range (which excludes the telephoto extremity and a zooming range in the close vicinity of the telephoto extremity), the radial projection 71a reaches the linear groove 10b1 from the inclined groove 10b2, while the zoom rotational ring 71 and the opening/closing ring 72 are rotated by the extension coil spring 76 in a direction to stop down the aperture formed by the set of three aperture blades 74 to the minimum aperture (see FIGS. 9B, 13C and 13D). Accordingly, the linear guide ring (linear guide member) 10 serves as a first rotation imparting member which rotates the opening/closing ring 72 by rotating relative to the variable aperture-stop mechanism 70 in the zooming range.

Figure 14:
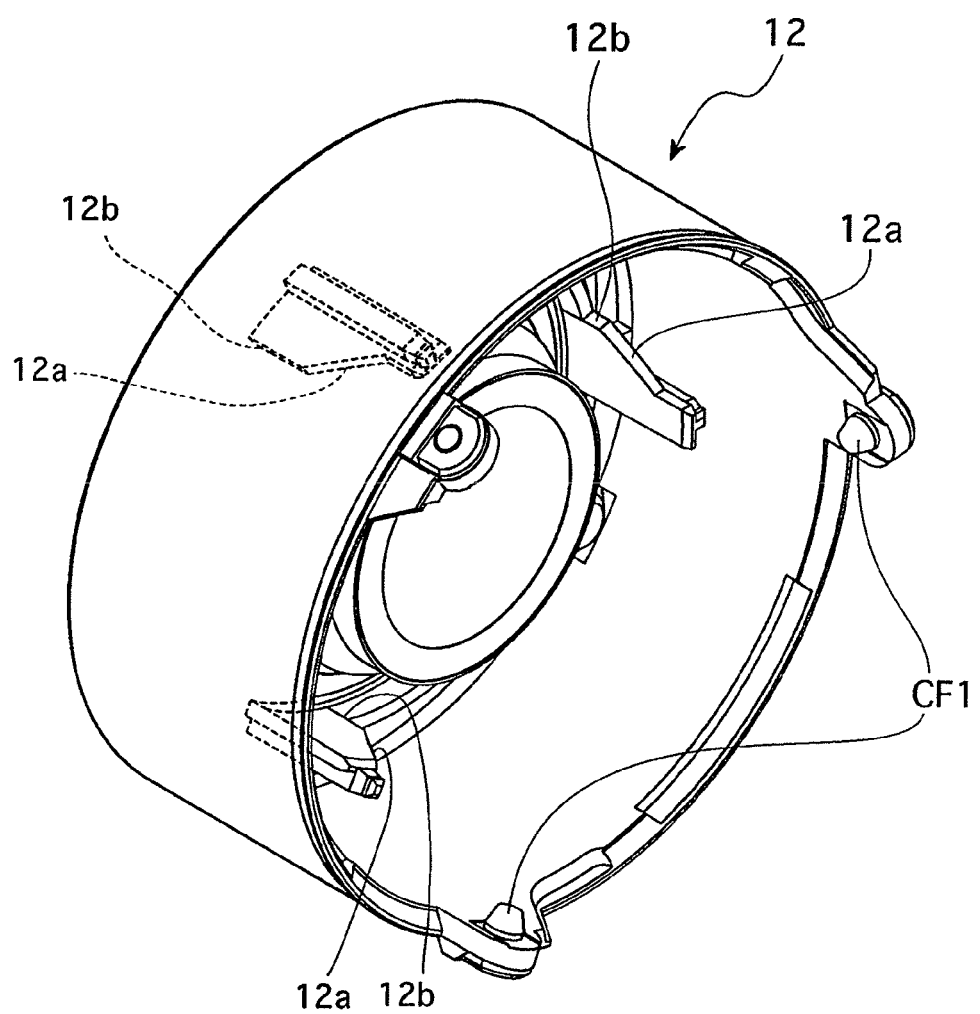
FIG. 14 is a rear perspective view of a second advancing barrel of the zoom lens barrel.

Similar to the zoom rotational ring 71, the opening/closing ring 72 is provided with a set of three radial projections 72b for controlling the rotational position of the opening/closing ring 72. The second advancing barrel 12 is provided with a set of three opening-guide surfaces 12a and a set of three opened-state holding surfaces 12b which are continuously formed with each of the opening-guide surfaces 12a, respectively, as shown in FIG. 14. When the zoom lens barrel ZL is fully retracted, the set of three radial projections 72b firstly engage with the set of three opening-guide surfaces 12a and slide thereon and subsequently engage with the set of three opened-state holding surfaces 12b and slide thereon, respectively, to independently rotate the opening/closing ring 72 to the maximum aperture opening position thereof, at which the size of the aperture formed by the set of three aperture blades 74 becomes maximum, upon the second advancing barrel 12 reaching the accommodated position (fully retracted position) thereof (while extending the extension coil spring 76 without rotating the zoom rotational ring 71). FIG. 14 shows the shape of the second advancing barrel 12, clearly showing the formation positions of the set of three opening-guide surfaces 12a and the set of three opened-state holding surfaces 12b. Accordingly, the second advancing barrel 12 serves as a second rotation imparting member which rotates the opening/closing ring 72 by moving between the accommodated position and a ready-to-photograph position (wide-angle extremity) in the zooming range relative to the variable aperture-stop mechanism 70. In the state shown in FIG. 8A in which the set of three radial projections 72b are spaced (away) from the set of three opening-guide surfaces 12a, respectively, (i.e., in a state where the zoom lens barrel ZL is in a ready-to-photograph state in the zooming range), the extension coil spring 76 is not extended. However, when the set of three radial projections 72b slidingly move onto the set of three opened-state holding surfaces 12b (as shown in FIG. 8C) after first coming into contact with and then sliding on the set of three opening-guide surfaces 12a, respectively (as shown in FIG. 8B), it can be seen from FIG. 8C that the extension coil spring 76 is extended (i.e., the opening/closing ring 72 is rotated relative to the zoom rotational ring 71).

FIGS. 13A through 13E show the functional roles of the zoom rotational ring 71 (the radial projection 71a, which is engaged in and disengaged from the rotation control groove 10b) and the opening/closing ring 72 (the set of three radial projections 72b, which are engaged with and disengaged from the set of three opening-guide surfaces 12a and the set of three opened-state holding surfaces 12b). FIG. 13A shows the positional relationship among elements of the variable aperture-stop mechanism 70 and other elements associated therewith when the zoom lens barrel ZL is set at the telephoto extremity, FIG. 13D shows the positional relationship among the same elements when the zoom lens barrel ZL is set at the wide-angle extremity, and FIG. 13E shows the positional relationship among elements of the variable aperture-stop mechanism 70 and other elements associated therewith when the zoom lens barrel ZL is accommodated (fully retracted). FIGS. 13B and 13C show the positional relationship among elements of the variable aperture-stop mechanism 70 and other elements associated therewith when the zoom lens barrel ZL is at two different focal length positions (an aperture opening position and an aperture stopping-down position) in the vicinity of the telephoto extremity, respectively. In the zooming range between the telephoto extremity (see FIG. 13A) and the aperture opening position (see FIG. 13B), the set of three aperture blades 74 is held at the maximum aperture since the radial projection 71a is not engaged in the rotation control groove 10b, whereas a zooming operation of the zoom lens barrel ZL from the aperture opening position (see FIG. 13B) to the aperture stopping-down position (see FIG. 13C) causes the radial projection 71a to slidingly move from the inclined groove 10b2 to the linear groove 10b1 of the rotation control groove 10b, thus stopping down the aperture formed by the set of three aperture blades to the minimum aperture size. In addition, when the zoom lens barrel ZL is in the accommodated position or positioned at the wide-angle extremity, the radial projection 71a is positioned in the linear groove 10b1 of the rotation control groove 10b as can be seen in the lower halves of FIGS. 13D and 13E, and the set of three aperture blades 74 are supposed to be held at the minimum-aperture forming positions thereof solely from the relationship between the set of three aperture blades 74 and the zoom rotational ring 71. However, when the zoom lens barrel ZL is in the accommodated position, the set of three aperture blades 74 are held at the maximum-aperture forming positions thereof because the opening/closing ring 72 is rotated along the set of three opening-guide surfaces 12a of the second advancing barrel in an aperture opening direction and held in a full-aperture state by the set of three opened-state holding surfaces 12b regardless of (independently of) the rotational position of the zoom rotational ring 71 as shown in the upper halves of FIGS. 13A through 13E.

As shown in FIGS. 6 and 8, the second lens group moving frame 8 is provided, on a surface thereof which faces the variable aperture stop sub-assembly SA, with a set of three safety projections (only two of which are shown in FIG. 6) 8c, and the opening/closing ring 72 of the variable aperture stop sub-assembly SA is provided with a set of three safety projections 72d (see FIG. 8) formed to correspond to the set of three safety projections 8c, respectively. The set of three safety projections 8c and the set of three safety projections 72d are formed on the second lens group moving frame 8 and the opening/closing ring 72, respectively, so as to be aligned in the optical axis direction (as shown in FIG. 8A) when the opening/closing ring 72 is in a small-aperture position thereof, and not to be aligned in the optical axis direction (as shown in FIG. 8C) when the opening/closing ring 72 is in a large-aperture position thereof. Namely, if the variable aperture stop sub-assembly SA retreats with the rotating operation of the opening/closing ring 72 being interfered with for some reason, the set of three safety projections 8c and the set of three safety projections 72d which are aligned in the optical axis direction bump against (interfere with) each other to thereby prevent the variable aperture stop sub-assembly SA from further retreating. On the other hand, when the opening/closing ring 72 is properly rotated in an aperture opening direction and reaches the full-aperture position, the set of three safety projections 8c and the set of three safety projections 72d are out of alignment in the optical axis direction, which allows the variable aperture stop sub-assembly SA to further retreat relative to the opening/closing ring 72.

Operations of the zoom lens barrel ZL that has the above described structure will be discussed hereinafter. In the lens barrel accommodated state shown in FIG. 2, the length of the optical system in the optical axis direction (the distance from the front surface (object-side surface) of the first lens group LG1 to the imaging surface of the image sensor 26) is shorter than that in a ready-to-photograph state shown in FIG. 1. In the lens barrel accommodated state, immediately after a transition signal for transition from the lens barrel accommodated state to a ready-to-photograph state (e.g., turning ON a main switch of the camera in which the zoom lens barrel ZL is incorporated) is input to the zoom lens barrel ZL, the zoom motor 150 is driven in the lens barrel advancing direction, which causes the cam ring 11 to advance in the optical axis direction while rotating. The linear guide ring 10 and the first advancing barrel 13 linearly move with the cam ring 11. Upon the cam ring 11 being rotated, the second lens group moving frame 8, which is guided linearly in the optical axis direction via the linear guide ring 10, is moved in the optical axis direction in a predetermined moving manner inside the cam ring 11 due to the engagement of the second cam followers CF2 with the second-lens-group control cam grooves CG2. Additionally, upon the cam ring 11 being rotated, the second advancing barrel 12, which is guided linearly in the optical axis direction via the first advancing barrel 13, is moved in the optical axis direction in a predetermined moving manner outside the cam ring 11 due to the engagement of the first cam followers CF1 with the first-lens-group control cam grooves CG1.

Namely, the amount of advancement of the first lens group LG1 from the lens barrel accommodated state is determined by the sum of the amount of forward movement of the cam ring 11 relative to the housing 22 and the amount of advancement of the second advancing barrel 12 relative to the cam ring 11, and the amount of advancement of the second lens group LG2 from the lens barrel accommodated state is determined by the sum of the amount of forward movement of the cam ring 11 relative to the housing 22 and the amount of advancement of the second lens group moving frame 8 relative to the cam ring 11. A zooming operation is carried out by moving the first lens group LG1 and the second lens group LG2 along the photographing optical axis O while changing the air distance therebetween. Upon driving the zoom motor 150 in a barrel-advancing direction so as to advance the zoom lens barrel ZL from the lens barrel accommodated state firstly causes the zoom lens barrel ZL to move to the wide-angle extremity shown in the upper half of the cross sectional view in FIG. 1, and further driving the zoom motor 150 in the same direction causes the zoom lens barrel ZL to move to the telephoto extremity shown in the lower half of the cross sectional view in FIG. 1. In the zooming range between the telephoto-extremity and the wide-angle extremity, the cam ring 11 rotates at a fixed position as described above, thus not moving either forward or rearward in the optical axis direction. Note that no picture taking operation can be performed until the zoom lens barrel ZL reaches the wide-angle extremity from the accommodated state.

Immediately after a transition signal for transition from a ready-to-photograph state to the lens barrel accommodated state (e.g., for turning OFF the aforementioned main switch of the camera in which the zoom lens barrel ZL is incorporated) is input to the zoom lens barrel ZL, the zoom motor 150 is driven in the lens barrel retracting direction, which causes the zoom lens barrel ZL to perform a lens barrel retracting operation reverse to the above described lens barrel advancing operation.

The barrier unit 101, which is fixed at the front end of the second advancing barrel 12, includes a set of barrier blades (not shown) which opens and shuts the front of the first lens group LG1. This set of barrier blades is shut when the zoom lens barrel ZL is in the accommodated state, and is opened in accordance with the lens barrel advancing operation of the zoom lens barrel ZL toward a ready-to-photograph position (the wide-angle extremity).

The third lens group frame 51 that supports the third lens group LG3 can be moved forward and rearward in the optical axis direction by the AF motor 160 independently of the above described driving operations of the first lens group LG1 and the second lens group LG2 that are performed by the zoom motor 150. In addition, when the photographing optical system of the zoom lens barrel ZL is in the zooming range from the wide-angle extremity to the telephoto extremity, the third lens group LG3 is moved in the optical axis direction to perform a focusing operation by driving the AF motor 160 in accordance with object distance information obtained by a distance measuring device (not shown) provided, e.g., in the camera in which the zoom lens barrel ZL is incorporated.

The shutter unit 100 and the variable aperture-stop mechanism 70 move in the optical axis direction and control the operation of the shutter blades 100S and the operation of the aperture blades 74, respectively, in a manner which will be discussed hereinafter while the zoom lens barrel ZL moves between the lens barrel accommodated position and a ready-to-photograph position (in the zooming range). In the zooming range (between the wide-angle extremity and the telephoto extremity) shown in FIG. 1, the shutter unit 100 is positioned at a rear position spaced farthest apart from the second lens group holding frame 2 (the second lens group LG2) by the biasing force of the compression coil spring 100$c$, while the variable aperture stop sub-assembly SA of the variable aperture-stop mechanism 70 is held at a position where the retaining ring 75 is in contact with the back surfaces of the plurality of retaining projections 8$b$ by the biasing force of the compression coil spring 78. At the telephoto extremity or in the vicinity thereof in the zooming range, the set of three aperture blades 74 is opened wider than the circular aperture 73$c$ of the base member 73 due to the positional relationship between the linear guide bar 10$a$ and the zoom rotational ring 71, and the full-aperture F-number is determined by the circular aperture 73$c$ (so that the aperture size is larger in this state than the aperture size at the wide-angle extremity) (see FIGS. 1 and 13A and 13B). On the other hand, in a wide-angle-side focal length range in the zooming range that excludes the telephoto extremity and focal lengths in the vicinity of the telephoto extremity, the set of three aperture blades 74 are stopped down to limit the incidence of harmful rays of light on the image sensor 26 due to the engagement of the rotation control groove 10$b$ (10$b$1) of the linear guide bar 10$a$ with the radial projection 71$a$ of the zoom rotational ring 71 (see FIGS. 1 and 13C and 13D). At a time of exposure, the set of shutter blades 100S of the shutter unit 100 are opened and shut while the ND filter 90 allows the amount of incident light which corresponds to a set F-number to pass therethrough.

Figure 2:
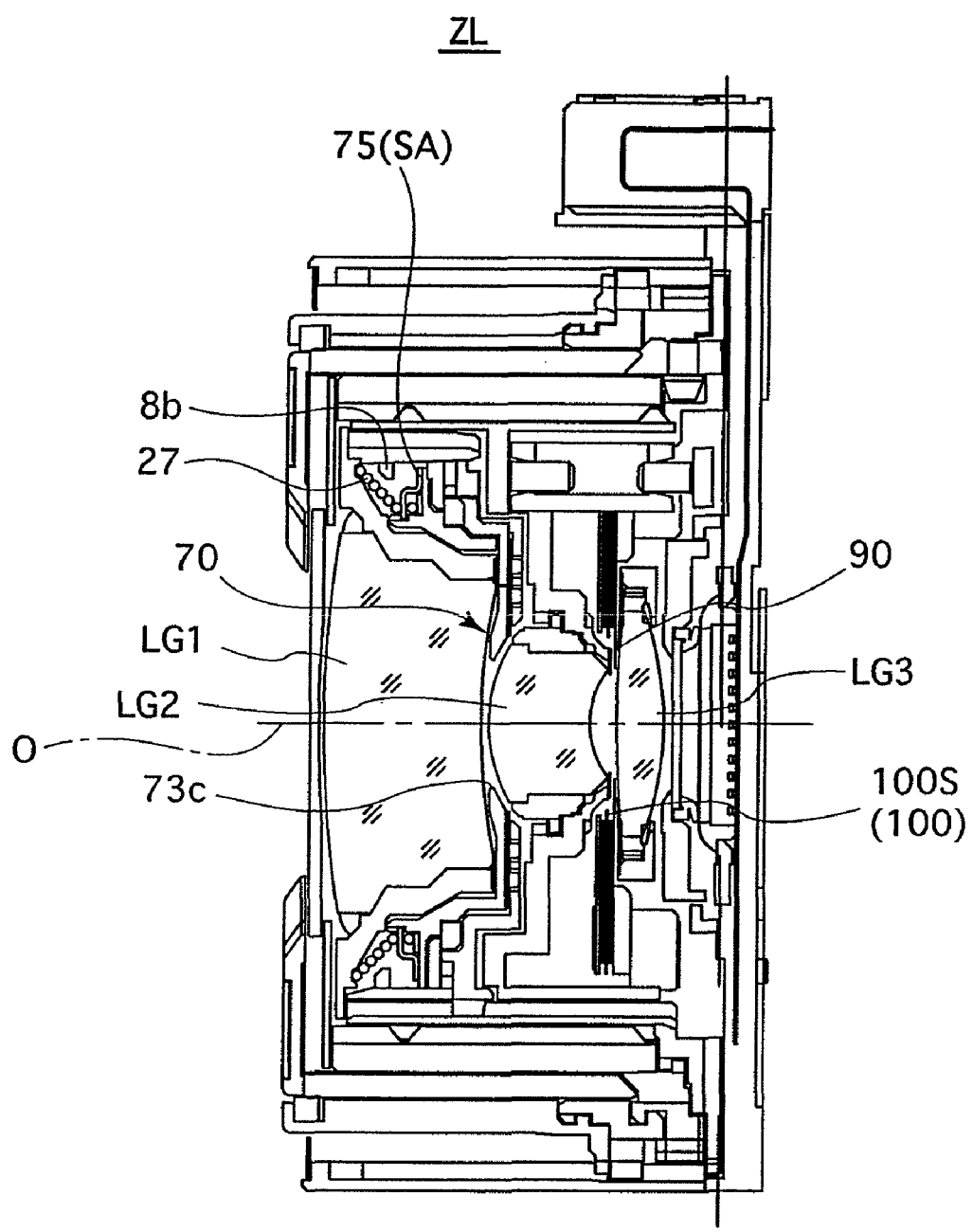
FIG. 2 is a cross sectional view of the zoom lens barrel in a lens barrel accommodated state (fully retracted state)

Movement of the zoom lens barrel ZL to the accommodated position shown in FIG. 2 from the zooming range shown in FIG. 1 causes the shutter unit 100 to come into contact with a member provided behind the shutter unit 100, such as the third lens group frame 51 or the image sensor holder 23, to thereupon be prevented from further moving rearward and also causes the second lens group moving frame 8 to approach the shutter unit 100 while compressing the compression coil spring 100$c$. At this time, the set of shutter blades 100S and the ND filter 90 are widely opened, and the rear part of the second lens group holding frame 2 (the second lens group LG2), which is positioned inside of the second lens group moving frame 8, partly enters into the adjacent openings of the widely opened set of shutter blades 100S and the ND filter 90 (see FIG. 2). Namely, a rear end surface of the second lens group holding frame 2 (the second lens group LG2) in which a plane orthogonal to the optical axis O lies is positioned behind a plane orthogonal to the optical axis O in which the set of shutter blades 100S lie.

Simultaneously, a rearward movement of the second advancing barrel 12 causes the set of three radial projections 72$b$ of the variable aperture-stop mechanism 70 (the variable aperture stop sub-assembly SA) to be pressed by the set of three opening-guide surfaces 12$a$ and the set of three opened-state holding surfaces 12$b$ of the second advancing barrel 12, respectively, which causes the opening/closing ring 72 to rotate in an aperture opening direction to open the aperture formed by the set of three aperture blades 74 to the maximum size, so that the maximum aperture thereat (full-aperture F-number) is defined by the circular aperture 73$c$ of the base member 73. Additionally, the rearward movement of the second advancing barrel 12 causes the retaining ring 75 and the variable aperture stop sub-assembly SA to be pressed rearward to approach the second lens group LG2 while compressing the compression coil spring 78. In this manner, the front end of the second lens group LG2 that is supported by the second lens group moving frame 8 enters the circular aperture (fully-open aperture) 73$c$ of the variable aperture stop sub-assembly SA which moves toward the second lens group LG2 to thereby achieve a reduction in length of the zoom lens barrel ZL in the accommodated state thereof (see FIG. 2). Namely, a plane with is orthogonal to the optical axis O and tangent to a front end surface of the second lens group LG2 is positioned in front of both a plane orthogonal to the optical axis O in which the circular hole 73c lies and a plane orthogonal to the optical axis in which the set of aperture blades 74 lie.

The size of the aperture formed by the set of three aperture blades 74 needs to be controlled with high precision only when the aperture is stopped down to the minimum size; in other words, the size of the aperture formed by the set of three aperture blades 74 does not need to be precisely controlled when the aperture is fully opened (because the full-open aperture is defined by the fixed circular aperture 73c). Accordingly, the structure of the aperture blade opening/closing mechanism for the set of three aperture blades 74 can be simplified, and hence, can be made smaller (downsized). In addition, since the set of three aperture blades 74, the full-open aperture of which is greater in aperture size than the fixed circular aperture 73c, is positioned closer to the second lens group LG2 than the fixed circular aperture 73c, the second lens group LG2 can be made to more easily (more deeply) enter the full-open aperture of the set of three aperture blades 74 to reduce the length of the zoom lens barrel ZL in its accommodated state.

Additionally, in the above described retracting operation of the zoom lens barrel ZL toward the accommodated position, in a state where the rotating operation of the opening/closing ring 72 is interfered with for some reason, the set of three safety projections 8c of the second lens group moving frame 8 and the set of three safety projections 72d of the opening/closing ring 72 remain aligned in the optical axis direction as shown in FIG. 8B. Due to this structure, even if the variable aperture stop sub-assembly SA attempts to move rearward with the opening/closing ring 72 still remaining in a small-aperture position (stopped-down position), the set of three safety projections 8c and the set of three safety projections 72d interfere with (bump against) each other to thereby prevent the stopped-down aperture formed by the set of three aperture blades 74 of the variable aperture stop sub-assembly SA and the second lens group LG2 (the second lens group holding frame 2) from accidentally interfering with (bumping against) each other. On the other hand, if the opening/closing ring 72 rotates properly in the aperture opening direction, the set of three safety projections 8c and the set of three safety projections 72d are not aligned in the optical axis direction (i.e., the positions of the set of three safety projections 8c and the positions of the set of three safety projections 72d deviate from each other in the circumferential direction). Accordingly, the rear end of the second lens group LG2 can be properly accommodated in the fully-open (widely open) aperture formed by the set of three aperture blades 74 of the variable aperture stop sub-assembly SA when the zoom lens barrel ZL is fully retracted.

As described above, strictly speaking, the second lens group holding frame 2 partly enters an opening formed by the fully-open (widely open) shutter blades 100S of the shutter unit 100 while the second lens group LG2 partly enters the fully-open (widely open) aperture (formed by the set of three aperture blades 74) of the variable aperture-stop mechanism 70 (the variable aperture stop sub-assembly SA) in the present embodiment of the zoom lens barrel; however, the second lens group holding frame is an element integral with the second lens group (aperture-control lens group) LG2. Accordingly, the element which at least partly enters both the opening formed by the fully-open shutter blades 100S of the shutter unit 100 and the fully-open aperture of the variable aperture-stop mechanism 70 by moving integrally with the second lens group (aperture-control lens group) LG2 when the zoom lens barrel ZL is fully retracted can be said to constitute part of the aperture-control lens group.

The minimum aperture of the variable aperture-stop mechanism 70 is defined by the set of three aperture blades while the maximum aperture of the variable aperture-stop mechanism 70 is defined by the circular aperture (fixed circular aperture) 73c in the above described embodiment of the variable aperture-stop mechanism 70. However, the maximum aperture of the variable aperture-stop mechanism 70 can be defined by the set of three aperture blades 74; in such a case the circular aperture (fixed circular aperture) 73c is not formed in the base member 73 (nor is formed to have a greater diameter than the maximum aperture formed by the set of three aperture blades 74).

Although the variable aperture-stop mechanism 70 and the shutter unit 100 are installed in front of and behind the second lens group LG2, respectively, in the above described embodiment of the zoom lens barrel, this positional relationship can be reversed. Namely, the variable aperture-stop mechanism 70 and the shutter unit 100 can be installed behind and in front of the second lens group LG2, respectively.

The second lens group, which is the smallest in diameter among all the three lens groups (specifically the three lens groups having a negative power, a positive power and a positive power, respectively, from the object side), serves as a aperture-control lens group in the above described embodiment of the three-lens-group zoom lens; however, for instance, in a zoom lens comprising four lens groups having a positive power, a negative power, a positive power and a positive power, respectively, from the object side, the third lens group having the smallest diameter can be made to serve as a aperture-control lens group.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A zoom lens comprising:
   a zoom optical system including movable lens groups for zooming which are moved between a ready-to-photograph position in a zooming range and an accommodated position behind said ready-to-photograph position in an optical axis direction, one of said movable lens groups serving as an aperture-control lens group;
   a variable aperture-stop mechanism which is positioned one of in front of and behind said aperture-control lens group and is movable relative to said aperture-control lens group in said optical axis direction, said variable aperture-stop mechanism including a plurality of aperture blades, a base member which supports said plurality of aperture blades so as to allow each of said plurality of aperture blades to rotate freely, and an opening/closing ring which rotates relative to said base member, forward and reverse rotations of said opening/closing ring causing said plurality of aperture blades to rotate to thereby vary a size of an adjustable aperture formed by said plurality of aperture blades;
   a first rotation imparting member, which rotates said opening/closing ring by a relative movement between said variable aperture-stop mechanism and said first rotation imparting member in said optical axis direction so as to hold said adjustable aperture at a small aperture size when said aperture-control lens group moves in said optical axis direction between a wide-angle extremity position thereof and a position in a vicinity of said wide-angle extremity position in said zooming range; and a second rotation imparting member, which rotates said opening/closing ring by a relative movement between said variable aperture-stop mechanism and said second rotation imparting member in said optical axis direction so as to open and hold said adjustable aperture at a large aperture size when said aperture-control lens group moves in said optical axis direction from said wide-angle extremity position in said optical axis direction to said accommodated position, wherein said aperture-control lens group is partly positioned in said adjustable aperture held at said large aperture size when said aperture-control lens group is positioned in said accommodated position.

2. The zoom lens according to claim 1, wherein said first rotation imparting member imparts a rotational force onto said opening/closing ring via another rotating ring, and wherein said second rotation imparting member imparts a rotational force directly onto said opening/closing ring.

3. The zoom lens according to claim 2, wherein said another rotating ring is connected with said opening/closing ring via a spring in a manner to rotate said opening/closing ring together with said another rotating ring when a rotational motion is imparted onto said another rotating ring, and to allow said opening/closing ring to solely rotate when a rotational force is imparted onto said opening/closing ring.

4. The zoom lens according to claim 1, wherein each aperture blade of said plurality of aperture blades is biased to rotate in a direction to open said adjustable aperture.

5. The zoom lens according to claim 1, further comprising a cam ring which moves said movable lens groups in said optical axis direction by forward and reverse rotations of said cam ring, wherein one and the other of said forward and reverse rotations of said cam ring cause each of said movable lens groups to move from said accommodated position to a telephoto extremity position via a wide-angle extremity position and from said telephoto extremity position to said accommodated position via said wide-angle extremity position, respectively.

6. The zoom lens according to claim 1, wherein said aperture-control lens group and said variable aperture-stop mechanism are supported by a single moving frame.

7. The zoom lens according to claim 6, wherein said first rotation imparting member guides said single moving frame linearly in said optical axis direction.

8. The zoom lens according to claim 7, wherein said opening/closing ring comprises a radial projection, and wherein said first rotation imparting member comprises at least one linear guide bar, which guides said single moving frame linearly in said optical axis direction; a rotation control groove, in which said radial projection of said opening/closing ring is engaged, being formed on said linear guide bar to control rotational position of said opening/closing ring.

9. The zoom lens according to claim 1, wherein said second rotation imparting member is positioned in front of said variable aperture-stop mechanism, and wherein said second rotation imparting member linearly moves toward and away from said opening/closing ring in said optical axis direction when said each of said movable lens groups is moved between said ready-to-photograph position in said zooming range and said accommodated position.

10. The zoom lens according to claim 9, wherein said opening/closing ring comprises at least one projection, wherein said second rotation imparting member comprises:

at least one first surface which extends in said optical axis direction; and at least one second surface which extends obliquely with respect to both said optical axis direction and a circumferential direction of said second rotation imparting member, wherein said first surface and said second surface respectively come into sliding contact with said projection of said opening/closing ring to control a rotational position of said opening/closing ring when said each of said movable lens groups is moved to said accommodated position.

11. The zoom lens according to claim 6, wherein said single moving frame moves in said optical axis direction when a zooming operation is performed.

12. The zoom lens according to claim 1, wherein said aperture-control lens group is positioned between a frontmost lens group and a rearmost lens group of said movable lens groups.

* * * * *